United States Patent [19]

Hsieh

[11] Patent Number: 5,783,080
[45] Date of Patent: Jul. 21, 1998

[54] PLATE FILTER WITH HIGH ODOR AND TOXIN REMOVING AND WATER ABSORBING CAPACITY AND ITS MANUFACTURING PROCESSES

[76] Inventor: Chin-San Hsieh, P.O. Box 28–24, Kaohsiung, Taiwan

[21] Appl. No.: 805,692

[22] Filed: Feb. 25, 1997

[51] Int. Cl.⁶ ............................................. B01D 39/00
[52] U.S. Cl. ................. 210/502.1; 210/503; 210/505; 210/508; 210/500.42; 264/45.1; 264/45.2; 427/244; 55/524
[58] Field of Search ................... 210/502.1, 505, 210/503, 500.42, 508; 55/524; 264/45.1, 45.2; 427/244

[56] References Cited

U.S. PATENT DOCUMENTS

| | | | |
|---|---|---|---|
| 3,857,732 | 12/1974 | Yoshino | 55/524 |
| 4,061,807 | 12/1977 | Shaler et al. | 210/502.1 |
| 4,190,696 | 2/1980 | Hart et al. | 210/502.1 |
| 5,059,578 | 10/1991 | Marumo et al. | 502/432 |

*Primary Examiner*—Ana Fortuna
*Attorney, Agent, or Firm*—Bacon & Thomas

[57] ABSTRACT

A plate fiber with high odor and toxin removing and water absorbing capacity and its manufacturing processes includes a catalyzer I such as hydrochloric acid, a catalyzer II such as formalin, a vegetable starch, PVA, and active carbon. The materials are orderly processed through mixing, stirring and being coated on a plate fiber. Then the plate fiber passes through a foaming step, an acid removing step, a cooling step, a washing and compressing step, a drying step, becoming a plate filter washable and able to remove odor and toxin sufficiently and absorb water.

8 Claims, 4 Drawing Sheets

| MATERIAL | WEIGHT PERCENTAGE | REMARK |
|---|---|---|
| PVA | 47 - 65 % | POLYVINYL ALCOHOL |
| VEGETABLE STARCH | 28 - 47 % | SWEET POTATO POWDER WITH WATER |
| CATALYZER I | 4.5 - 10.0 % | HYDROCHLORIC ACID OF 32% CONCENTRATION |
| CATALYZER II | 3.6 - 10.0 % | FORMALIN OF 37% CONCENTRATION |
| ACTIVE CARBON | 0.3 - 180 % | BY NECESSITY |
| FIBER | | THICKNESS BY NECESSITY |
| FOAMING AGENT | 0.015 - 0.06 % | BY CHOICE |

FIG.3

| TESTING SORT | TESTING RESULT | TESTING METHOD |
|---|---|---|
| BREAKING | 20 ~ 33 kg/cm² | CNS 3479, 5613 |
| TENSION | 45 ~ 60 kg/cm² | CNS 3479, 3553 300 mm/min |
| ABRASION | abrasion index =0.027 ~ 0.033 (500 g, 1000 times) | CNS 3309, 6483 |
| ABSORBING | absorbing percentage 250 ~ 300 % | CNS 7819, K6688 |

FIG.6

PLATE FILTER WITH HIGH ODOR AND TOXIN REMOVING AND WATER ABSORBING CAPACITY AND ITS MANUFACTURING PROCESSES

BACKGROUND OF THE INVENTION

This invention concerns a plate filter with high odor and toxin removing and water absorbing capacity and its manufacturing processes, particularly able to absorb water, washable, good to filter, good to remove odor and toxin.

A main function of a filter net is to filter miscellaneous substances, odor and toxin in air and water so as to obtain clean air or water. For example, a a sponge used at present as a filter may have function of removing miscellaneous matters, but no function of removing odor or toxin, and prone to decay after a period of use because it has no endurable structure to last long.

As shown in FIG. 1, a filter net 10 is sprayed a layer of active carbon 11 on its outer surface to remove odor in a prior art, but this method cannot keep the active carbon firmly adhered, only coating it on the surface. The layer of active carbon is liable to peel off by touching or washing, and in addition, active carbon cannot be used too much, and thus limited in filtering effectiveness. Further, to prevent the layer of active carbon from dropping or peeling off, some makers use a thin layer of non-fabric 12 on an outer surface of a filter net. However, this method only collects peeled or dropped-off active carbon, having no substantial effect of filtering, resulting in the increased cost.

A U.S. Pat. of No. 3857732 disclosed a manufacturing process for an odor-removing filter net, wherein liquid PVA (ployvinyl alcohol) is added with ion-exchanging resin, active carbon or coconut shell charcoal, becoming a paste solution, in which an acid agent is added, and then this mixed solution is coated on a non-fabric. And lastly, the non-fabric soaked with the mixed solution is dehydrated in 70–100° C. for 30–120 minutes, finishing the filter net. In this process referred, active carbon is not mentioned at all, but it is already added before this process begins, absorbed and surrounded in the paste-like solution. In this prior art the strong absorbing character of active carbon is not taken into consideration, but active carbon is already added in the paste solution, and absorbs it and thus surrounded by it. After this wrong process has happened, even in a dehydrating step, the active carbon is completely surrounded inside, impossible to pass through percolating air holes to move out in the open air, as shown in FIG. 2, wherein the active carbon 20 is obstructed from reaching the percolating holes 21 for performing functions of filtering, and removing toxin and odor. At the same time, this referred case does not mention stability, structure and absorbability of the filter net, and thus so far has not been realized as merchandise.

SUMMARY OF THE INVENTION

A main purpose of the present invention is to offer a plate filter with high odor and toxin removing and water absorbing capability, being washable, good to filter, and good to remove odor and toxin, and its manufacturing processes.

A feature of the invention is first to prepare a catalyzer I (such as hydrochloric acid), a catalyer II ( such as formalin), a vegetable starch (sweet potato powder), a liquid non-particle PVA (BF-17), and active carbon as main materials. Then these materials are orderly mixed and stirred, and then they pass through a coating step, a foaming step, an acid removing step, a cooling step, a washing and compressing step, and a drying step, becoming a plate filter, which has characteristics of absorbing, washability, filtering, and removing odor and toxin at the same time.

Another feature of the invention is that this plate filter contains the catalyzer II (such as formalin) of 3.6–10.0 percent by weight, the catalyzer I (such as hydrochloric acid of 4.5–10.0 percent by weight, a vegetable starch 28–47 percent by weight, liquid non-particle PVA of 47–65 percent by weight, active carbon and fiber of 0.3–180 percent by the aggregate weight of the former four materials.

BRIEF DESCRIPTION OF DRAWINGS

This invention will be better understood by referring to the accompanying drawings, wherein:

FIG. 3 is a table of materials for a plate filter with high odor and toxin removing and water absorbing capacity in the present invention;

DESCRIPTION OF THE PREFERRED EMBODIMENTS

Figure 1:
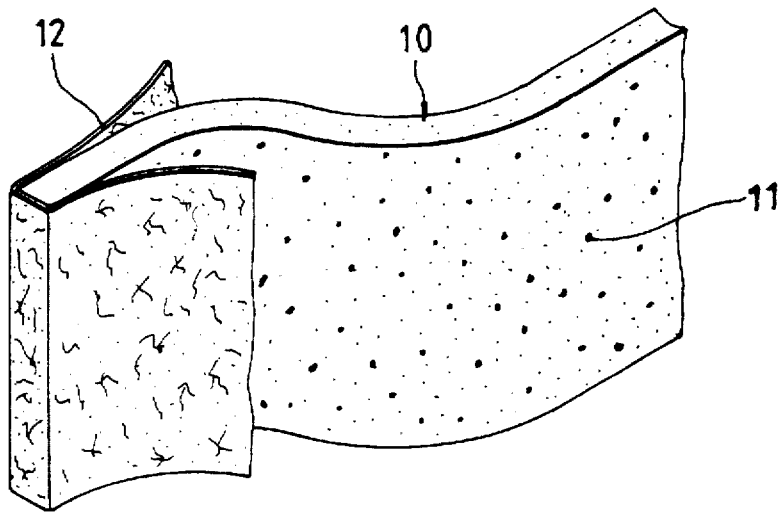
FIG. 1 is a perspective view of a known conventional filter net with a layer of active carbon sprayed on its surface.
Figure 2:
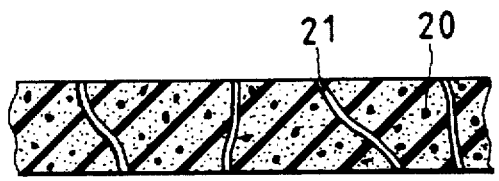
FIG. 2 is a cross-sectional view of another known conventional filter net for removing odor.
Figure 5:
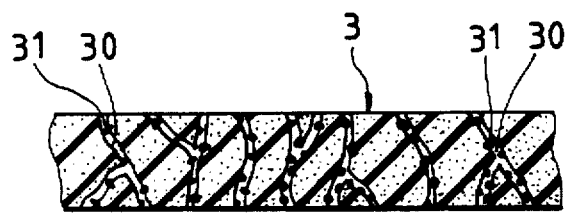
FIG. 5 is a cross-sectional view of the plate filter in the present invention; and, FIG. 6 is a table of test results of the plate filter in the present invention.
Figure 4:
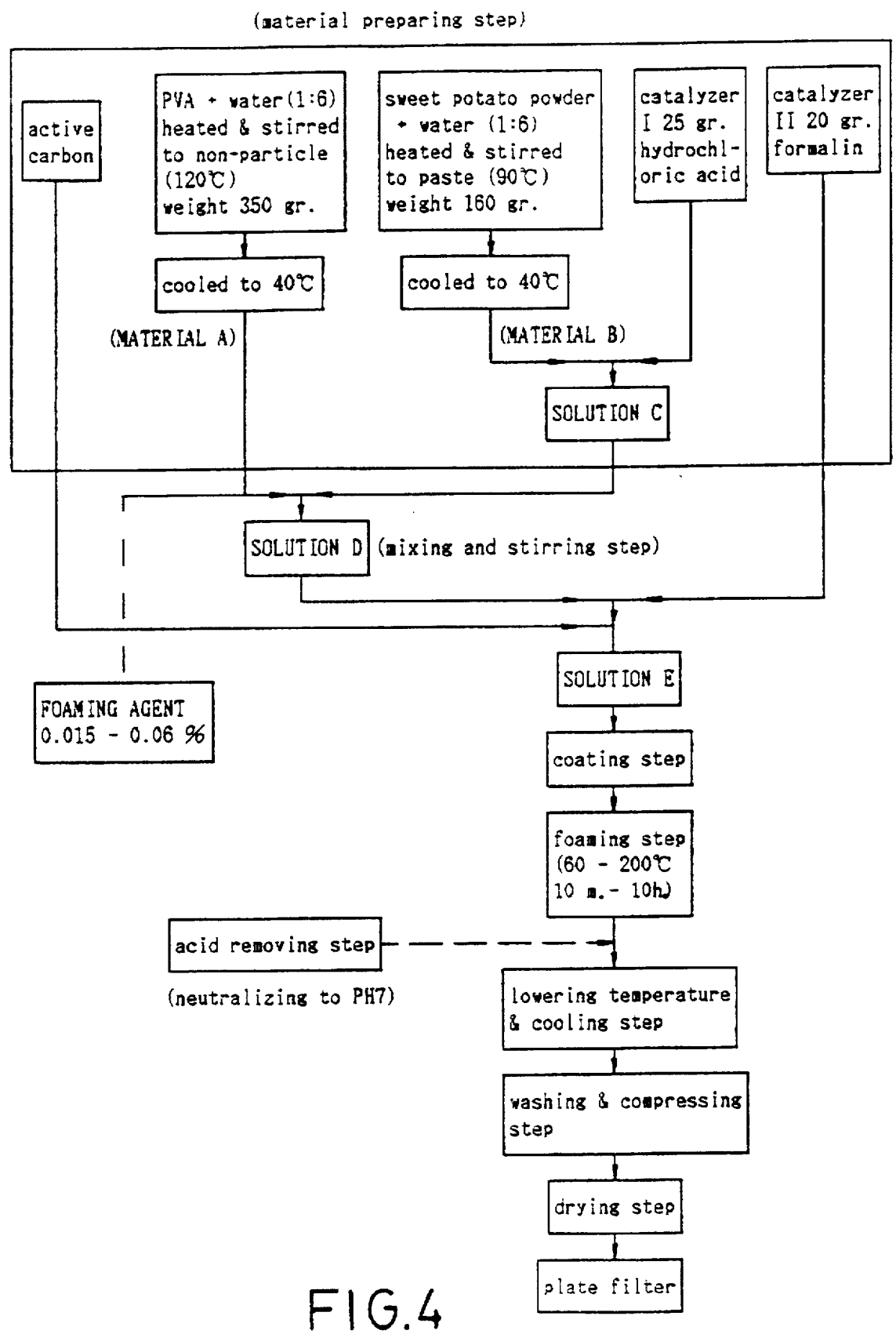
FIG. 4 is a flow chart of manufacturing processes for the plate filter in the present invention.

A preferred embodiment of a plate filter with high odor and toxin removing and water absorbing capacity in the present invention, as shown in FIGS. 3, 4 and 5, contains a catalyzer II such as formalin of 3.6–10.0 percent by weight, a catalyzer I, such as hydrochloric acid of concentration 32 percent, of 4.5–10.0 percent by weight, a paste-like vegetable starch, such as sweet potato powder, of 28–47 percent by weight (the proportion of the starch to water being 1:5–1:10, and 1:6 used in this example), and liquid non-particle PVA (for example, BF-17 produced by Chan Chum Chemical Co. Ltd, in proportion of PVA to water being 1:5–1:10, and 1:6 used in this example) of 47–65 percent by weight, and active carbon and fiber (preferably in a plate form) of 0.3–180 percent by the aggregate weight the former four materials, but active carbon can be adjusted according to necessity, and it must be noted that the more active carbon is added, the more brittle the structure of the filter becomes. In the example of the present invention, a foaming agent of 0.015–0.06 percent by the aggregate weight of the former four materials, in correspondence to the active carbon.

After the materials mentioned above, the catalyzer I, the catalyzer II, paste-like vegetable starch, PVA ( BF-17) and active carbon, are prepared, firstly PVA (BF-17) is mixed with water, heated and stirred into non-particle and then cooled to become material A. Then the vegetable starch is mixed with water, heated and stirred into paste, and then cooled to become paste-like material B, in which the catalyzer I is mixed, becoming solution C. Then the material A is mixed with the solution C to become solution D, then the catalyzer II is then mixed and stirred in this solution D to become an even solution. The catalyzer II can function to surely assist the paste-like vegetable starch mixed with the liquid non-particle PVA to react. A mixing and stirring step forces paste-like material B with the catalyzer I mix completely to become solution C, which is then mixed and stirred with the material A to become solution D, which is then mixed with the catalyzer II to become a saturated solution, and then finally active carbon is mixed in this saturated solution to become solution E.

As shown in FIG. 5, the most important step is mixing active carbon in the saturated solution in the present invention. Because active carbon has a characteristic of absorbing matter around it with strong force, it may undoubtedly absorb paste-like vegetable starch in the mixing and stirring step, and be surrounded inside the cool paste-like starch. If this wrong flow process should happen, active carbon will be completely surrounded therein, unable to reach the open air through percolating holes, even if the plate filter has passed through steps of dehydrating and mixing the catalyzers I and II. Consequently, a plate filter cannot obtain functions of good filtering, removing odor and toxin because of the active carbon obstructed dead, unable to move. Therefore, completely mixing active carbon with the saturated solution of paste-like vegetable starch mixed with liquid non-particle PVA is an essential art in the present invention. This important invention improves the drawback of the prior art that active carbon is only sprayed on the surface of a filter, impossible to absorb with strong force because of an obstructed-dead condition and possible to be peeled or fall off by washing or touching.

How to prepare and mix the materials in manufacturing processes is described as follows. (1) PVA is mixed with water in the proportion 1: 6, and then heated up to 120° C. or so and stirred at the same time making it into a non-particle condition. Then it is cooled down to 40° C. or so, becoming a material A, with its whole weight being 350 grams. (2) A vegetable starch (such as sweet potato powder) is mixed with water in the proportion 1:6, heated up to 90° C. or so, and stirred at the same time into a paste condition. Then it is cooled down to 40° C. or so, becoming a paste-like material B, with its whole weight being more than 160 grams. (3) A catalyzer I, for example in the invention, hydrochloric acid of 32 percent concentration, is prepared, having weight more than 25 grams. (4) A catalyzer II is prepared, having function of assisting and promoting chemical reaction, and in the present example, formalin with 37 percent concentration is used, with its weight being more than 20 grams. (5) Active carbon is prepared, and in the present invention it is used in the proportion 0.3–180 percent to the aggregate weight of the material finally got in the process (4). (6) A foaming agent can be prepared, and in the present invention it is used in the proportion 0.015–0.06 percent to the aggregate weight of the material got in the process (5).

A mixing process is performed after preparation of the necessary materials just described. First, the cooled paste-like material B is sufficiently mixed with the catalyzer I, becoming the solution C, which is then mixed and stirred to become the solution D. Then the solution D is mixed and stirred sufficiently with the catalyzer II to become the saturated solution E, in which is finally mixed active carbon. After that, the solution E with active carbon is evenly spread to coat on a plate fiber being continually conveyed along. The plate fiber can be of any thickness according to necessity. Then the plate fiber coated with the solution E with active carbon is moved into a foaming process, wherein it is placed in a reaction furnace with an inner temperature adjusted within 60–200° C. for 10 minutes to 10 hours for foaming. The temperature of the reaction furnace can be adjusted according to different demand, and the length of the furnace and the speed of the process are also adjustable. The foaming step is to let the materials A and B produce close-linking action and removing water by means of temperature and time so that the material plate fiber may become porous with many tiny percolating holes 30, i.e. a well-structured plate filter 3. Water removed temporarily stays in the percolating holes 30 and completely removed out of the plate filter 3 by another step taken later. The gotten wet plate filter 3 contains active carbon 31 strongly attaching on the surface or in he interior of the filter 3, and with cooperation of the percolating holes 30 active carbon 31 may come in contact with flowing gas or air to filter the gas. Then the plate filter 3 is cooled down to the room temperature and then moved into a washing and compressing step, allowing the plate filter 3 show neutral feature, washed and compressed to remove water and the catalyzer I still remained in the percolating holes 30. High water containing feature of the present invention can be obtained by existence of many percolating holes and by water absorbing character of the materials themselves, and consequently the plate filter in the present invention can absorb and store a large quantity of water. After that, it is dried up to become a plate filter having excellent stability and high odor and toxin removing and water absorbing capacity.

As shown in FIG. 4, in the present invention, an acid removing process may be added to the processes described above, just after the foaming process. In the acid removing process, a neutralizing agent, such as soder water used in the present example, is added to the plate filter coming out of the foaming process, letting it produce neuter reaction of PH7 to get rid of remaining organic acid therein. But, of course, to completely removing organic acid, washing process can also be used by prolonging its time, as the acid removing process by adding neutralizing agent may be liable to harm the plate filter in some degree.

As shown in FIG. 4, a foaming agent of 0.015–0.06 percent by weight can be added in the aggregate weight of the materials in the present invention. The foaming agent may be PNS of a commercial name, and also called a dispersing agent, consisting of P-toluene sulfonate and Alkyl sulfonate. A plate filter produced with this foaming agent has structure comparatively loose and porous with many rather large percolating air holes, not in a cellular condition. Consequently, the filter has better percolation. Though usage of a foaming agent in a filter is commonly described in books, it may be the first attempt that a foaming agent is used with other materials in a filter in such a way as described in this invention, and this art contributes to industry in a great degree, largely elevating utilizable worthiness and functions of a filter.

In addition, in the manufacturing processes wherein the materials of a filter are mixed and stirred, a foaming agent is added therein before active carbon is added so that the plate filters thus produced can remove odor and toxin by means of active carbon, and increase percolating and dispersing effect of a plate filter. Especially, absorbing function reaches as much as 276.8 percent, so a plate filter added with a foaming agent and active carbon according to the present invention has functions of percolating, easy washing, filtering, and removing odor and toxin at the same time. In other words, a plate filter according to the present invention possesses more functions than a conventional plate filter does.

FIG. 6 clearly shows that a plate filter produced according to the present invention has a good antitension, antideformation, low percentage of deformation, good softness, low abrasion, and high absorbing effect, etc. By the way, CNS is an abbreviation of Chinese National Standard.

While the description of the preferred embodiments of the invention have been described above, it will be recognized and understood that various modifications may be made therein and the appended claims are intended to cover all such modifications which may fall within the spirit and scope of the invention.

What is claimed is:

1. Manufacturing processes for a plate filter with high odor and toxin removing and water absorbing capacity, comprising:

a material preparing step wherein PVA is mixed with water, heated and stirred at the same time, making it in a non-particle condition, and then cooled down a vegetable starch is mixed with water, heated and stirred at the same time until it becomes starch paste and then cooled down; catalyzers I and II for assisting chemical reaction, active carbon and plate fiber are prepared, wherein said catalyzer I is hydrochloric acid and said catalyzer II is formalin;

a stirring and mixing procedure wherein said cooled starch paste is mixed and stirred sufficiently with said catalyzer I to become a first material solution; said first material solution is then mixed with said PVA to become a second material solution; said second material solution is then mixed and stirred sufficiently with catalyzer II to become a third saturated material solution; said third saturated material solution is then finally mixed with active carbon to become a fourth material solution;

a coating step wherein said fourth material solution is coated on said plate fiber;

a foaming step wherein said plate fiber coated with said fourth material solution is placed in a reaction furnace, which has temperature adjustable for different demanding for foaming, a length adjustable and foaming speed also adjustable according to different demand, wherein said foaming step causes the formation of percolating holes through said plate fiber;

a cooling step wherein said plate fiber having finished said foaming step is cooled down to a room temperature;

a washing and compressing step wherein said plate fiber having finished said cooling step is washed to neutralize said plate fiber into a neutralized condition, and then compressed to remove water and said catalyzers I and II still remaining in said percolating holes of said plate fiber; and, a drying step wherein said plate fiber having finished washing and compressing steps is dried to become a completely finished plate fiber with excellent stability and with high odor and toxin removing and water absorbing capacity; and said manufacturing process is carried out with the proviso that a foaming agent is added in said preparing material steps in proportion of 0.015–0.06 percent to the aggregate weight of said materials.

2. The manufacturing processes for a plate fiber with high odor and toxin removing and water absorbing capacity as claimed in claim 1, wherein foaming temperature required in said foaming step is 60–200° C., and foaming time required is 10 minutes to 10 hours.

3. The manufacturing processes for a plate filter with high odor and toxin removing and water absorbing capacity as claimed in claim 1, wherein said coating step is carried out by coating said saturated solution on said plate fiber conveyed continuously, and said plate fiber may have any thickness according to necessity.

4. The manufacturing processes for a plate fiber with high odor and toxin removing and water absorbing capacity as claimed in claim 1, wherein an acid removing step is further used after said foaming step, adding a neutralizing agent to neutralize said plate fiber still having a little acid remaining therein.

5. The method of claim 1 wherein said foaming agent is a mixture consisting of p-toluene sulfonate and alkyl fulfonate.

6. The plate filter obtained by the method of claim 5.

7. The plate filter obtained by the method of claim 1.

8. A plate filter with high odor and toxin removing and water adsorbing capacity comprising a catalyzer II in a proportion of 3.6–10.0 percent by weight, a catalyzer I in a proportion of 4.5–10 percent by weight, a vegetable starch paste in a proportion of 28–47 percent by weight, liquid non-particulate PVA (polyvinyl alcohol) in a proportion of 47–65 percent by weight, and active carbon and fiber in a proportion of 0.3–180 percent by weight of all of said catalyzers, PVA and starch paste.

\* \* \* \* \*